United States Patent Office 2,895,022
Patented July 14, 1959

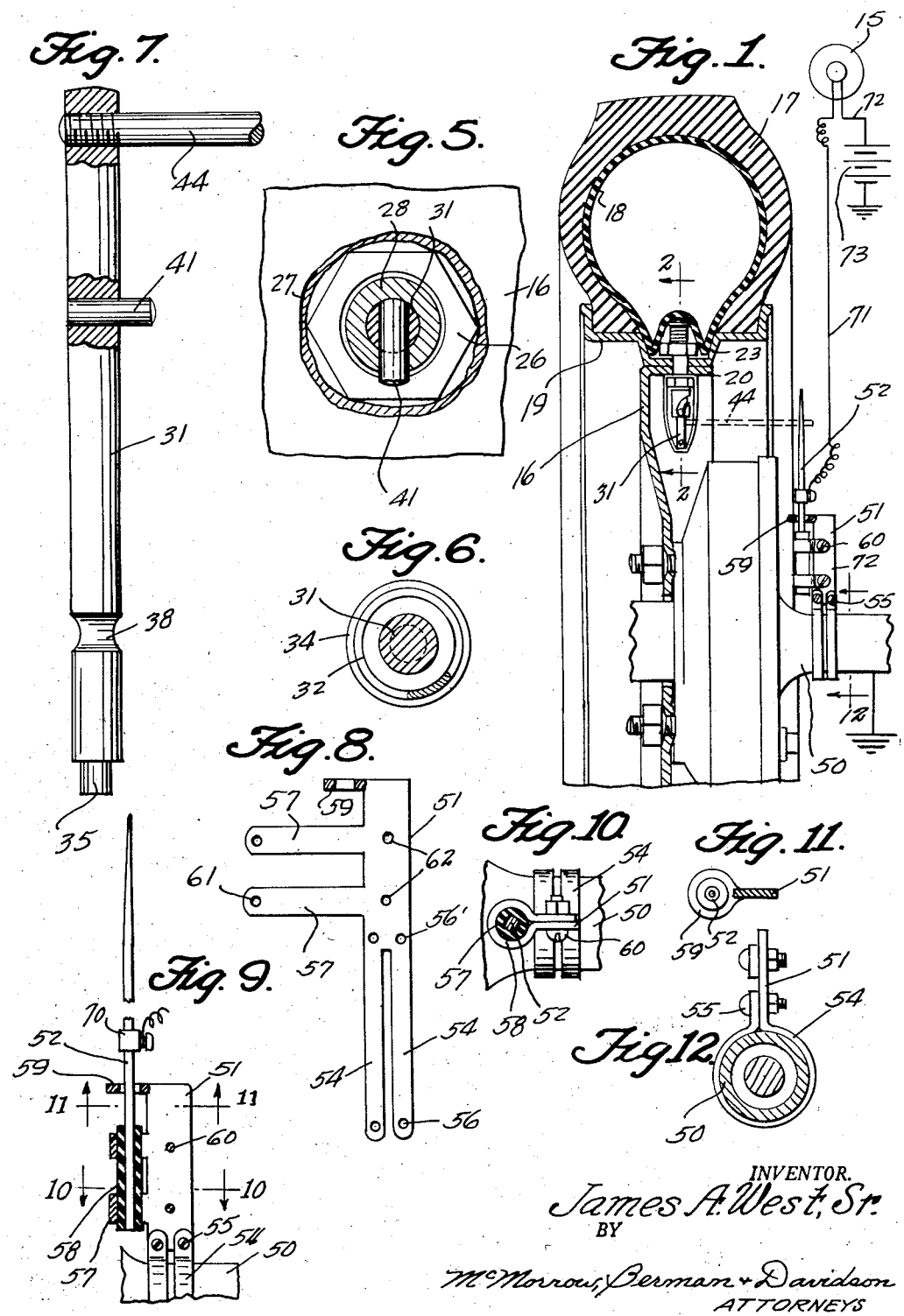

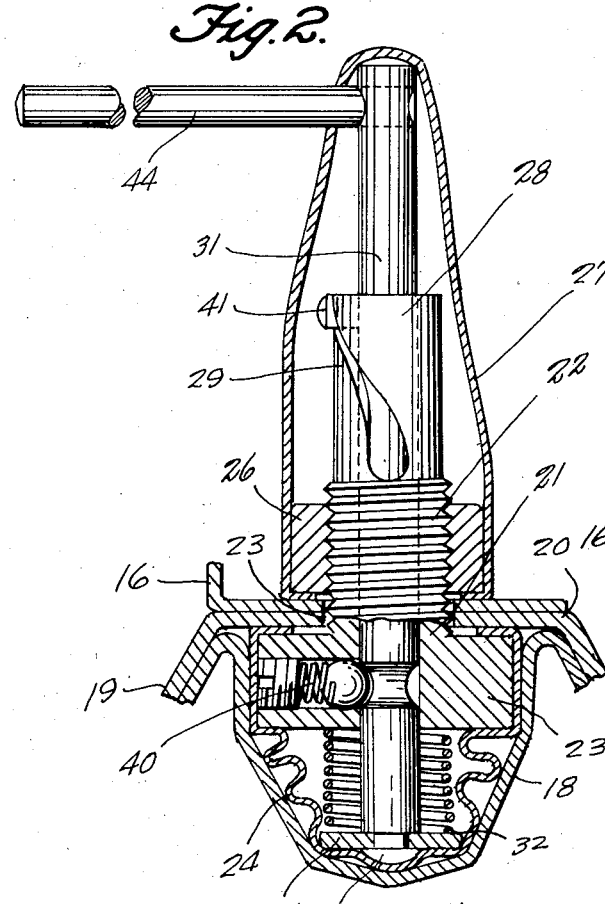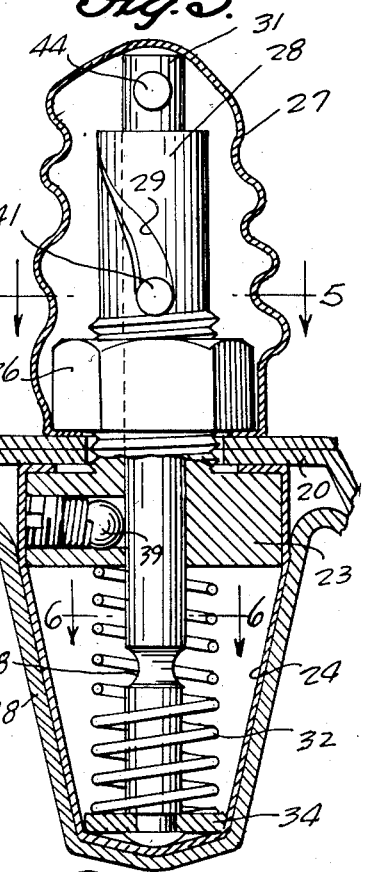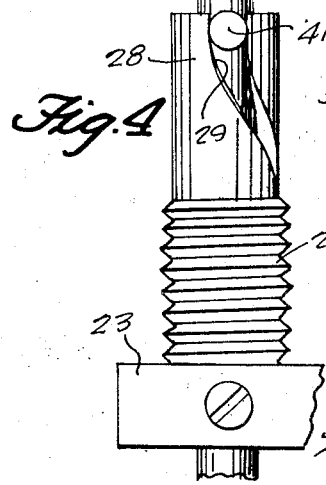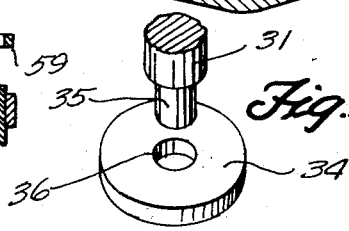

2,895,022

LOW TIRE PRESSURE WARNING DEVICE

James A. West, Sr., Chicago, Ill.

Application July 25, 1958, Serial No. 750,903

4 Claims. (Cl. 200—61.26)

This invention relates to safety equipment for motor vehicles, and more particularly to an air pressure signalling device for providing a warning signal when air pressure in the tires of a motor vehicle drops below a safe value.

A main object of the invention is to provide a novel and improved electrical tire pressure signalling device which is simple in construction, which is easy to mount on a vehicle wheel having a pneumatic tire, and which provides a dependable warning indication when the air pressure in the tire drops below a safe value.

A further object of the invention is to provide an improved pressure-responsive switch means for use on a motor vehicle wheel employing a pnuematic tire, said switch means involving inexpensive components, being rugged in construction, and being reliable in operation to provide a warning signal when the air pressure in the associated tire drops below a safe value.

Further objects and advantages of the invention will become apparent from the following description and claims, and from the accompanying drawings, wherein:

Figure 1 is a transverse vertical cross sectional view taken through the upper portion of a motor vehicle wheel equipped with an improved tire pressure signal device according to the present invention.

Figure 2 is an enlarged vertical cross sectional view taken on the line 2—2, but inverted, showing the switch means of the tire pressure signalling device in its normal condition.

Figure 3 is a cross sectional view similar to Figure 2 but showing the switch means of the signalling device in signaling position.

Figure 4 is a fragmentary detail view of the sleeve member and a portion of the plunger member associated therewith, as employed in the signalling switch means of Figures 1, 2 and 3.

Figure 5 is a horizontal cross sectional view taken on the line 5—5 of Figure 3.

Figure 6 is a horizontal cross sectional detail view taken on the line 6—6 of Figure 3.

Figure 7 is a fragmentary side elevational detail view of the plunger member and signalling arm associated therewith, said view being partly in cross section.

Figure 8 is an enlarged elevational view, partly in vertical cross section, of the bracket member employed to support the flexible grounding contact element employed in conjunction with the signalling switch assembly illustrated in Figures 2, and 3, the bracket member being shown in its initial unformed condition.

Figure 9 is an enlarged vertical cross sectional view taken through the upper portion of the grounding contact supporting assembly, including the bracket of Figure 8, and showing the manner in which the flexible contact arm is disposed in the contact ring of the bracket member so as to engage therewith responsive to actuation by the arm of the assembly illustrated in Figures 2 and 3 when said arm is in signalling position.

Figure 10 is a horizontal cross sectional view taken on the line 10—10 of Figure 9.

Figure 11 is a horizontal cross sectional view taken on the line 11—11 of Figure 9.

Figure 12 is an enlarged vertical cross sectional detail view taken on the line 12—12 of Figure 1.

Figure 13 is an enlarged fragmentary perspective view showing the manner in which the reduced bottom end portion of the plunger member of the switch-operating assembly is engaged with an abutment washer so that it may be subsequently deformed and upset beneath the washer to provide the connection illustrated in Figures 2 and 3.

Figure 14 is an enlarged fragmentary vertical cross sectional view, similar to Figure 9, and showing the manner in which the flexible contact element is bent to engage the grounding ring of the bracket member shown in Figure 8 responsive to contact by the signalling arm of the assembly of Figures 2 and 3.

Referring to the drawings, the electrical tire pressure signal system of the present invention comprises respective individual signalling assemblies associated with respective wheels of the vehicle, each signalling assembly being electrically connected so as to energize at times a respective signal lamp 15 mounted on the instrument panel of the vehicle, or at any other suitable location, so that the operator of the vehicle will be instantly informed as to the specific wheel having the under-inflated tire. Thus, each wheel 16 is provided with a pneumatic tire 17 which may be either of the tubeless type or of the type provided with an inner tube 18. Each wheel 16 is provided with the conventional rim 19 having the drop center portion 20, defining an annular well in the periphery of the rim, as shown.

Designated at 21 is a bushing or sleeve member which has an externally threaded portion 22 extending through an opening 23 formed in the bottom wall of the peripheral channel 20, the threaded portion 22 projecting toward the wheel axis and being substantially perpendicular thereto. The sleeve member 21 is formed with the enlarged collar portion 23 which is disposed in the annular channel 20. A sack member 24 of flexible resilient deformable material, such as rubber or the like, is secured at its rim between the collar element 23 and the bottom wall of the channel 20 by a clamping nut 26 engaged on the externally threaded portion 22. The nut 26 also clamps the rim portion of an external cover or sack member 27 of flexible material which covers the smooth outer end portion 28 of the sleeve member 21.

As shown in Figures 2 and 3, the smooth portion 28 is an integral extension of the sleeve member and is formed with the helical cam slot 29 which extends for an angle of substantially 90° around the axis of the sleeve member. Designated at 31 is a plunger member which is slidably and rotatably received in the sleeve member 21 and which is normally biased inwardly relative to the associated pneumatic tire 17 and inner tube 18 by a coiled spring 32 surrounding the plunger member 31 and bearing between the collar member 23 and a washer 34 secured to the end of the plunger member, as is clearly shown in Figures 2 and 3.

As shown in Figure 13, the plunger member 31 originally is provided with the reduced end portion 35 which is engageable through the central aperture 36 of the washer member 34 and which is subsequently upset or peened over, as shown at 37, whereby to rigidly secure the washer member 34 against the bottom shoulder defined adjacent to the reduced portion 35.

As shown in Figure 2 the biasing spring 32 is normally held in its compressed condition by the air pressure in the inner tube 18, said inner tube acting directly against the washer 34 through the flexible sack member 24. To insure that the plunger member 31 will not be prematurely released, said plunger member is provided with an annular groove 38 which is yieldably engaged by a ball detent 39 mounted in the collar member 23, said ball detent being biased inwardly by a spring 40 contained in the collar member 23, as is clearly shown in Figure 2. When the air pressure in the tire drops below a safe value, the force of spring 32 is sufficient to overcome the holding action of the ball detent 39, whereby the spring is allowed to expand to the condition thereof illustrated in Figure 3, moving the plunger member 31 downwardly through the sleeve member 21, as viewed in Figures 2 and 3.

The plunger member 31 is provided on its outer portion with a pin element 41 which projects through the cam slot 29 and which is slidably engageable therewith, whereby to rotate the plunger member 31 responsive to the longitudinal movement thereof in the sleeve member 21 as the spring 32 expands. As will be readily apparent, since the slot 29 subtends an angle of approximately 90°, the plunger member is similarly rotated through this angle as it moves longitudinally from the position thereof illustrated in Figure 2 to the position thereof shown in Figure 3.

Rigidly secured to the end portion of the plunger member 31 remote from the washer 34 is an arm 44, extending substantially perpendicular to the plunger member, as shown in Figure 2, and extending through the flexible cover 27. When the plunger member 31 is in the normal position thereof illustrated in Figure 2, the arm 44 extends substantially parallel to the plane of the wheel 16. However, when the plunger member is moved longitudinally by the expansion of spring 32, resulting from an abnormal decrease in tire pressure to a value below a specified safe limiting value, the arm 44 is rotated to a position projecting perpendicular to the plane of the wheel 16. This position is illustrated in dotted view in Figure 1.

Secured to any suitable portion of the vehicle frame adjacent the wheel, for example, on the wheel housing 50 is a bracket member 51 on which is supported a flexible contact arm 52 extending substantially parallel to the plane of the wheel 16. The bracket member 51 may comprise for example a pair of strap members 54, 54 which may be curved around the wheel housing 50 and clampingly secured thereto by suitable fastening bolts 55 extending through registrable apertures 56, 56' provided in the finger elements 54 and the main body of the bracket member 51. The bracket member is similarly formed with a pair of malleable arms 57, 57 which are engaged around a suitable insulating sleeve 58 in which is disposed the flexible contact arm 52. The finger members 57, 57 are bent around the sleeve 58 and are clampingly secured by suitable bolts 60 extending through registrable apertures 61, 62 formed in the finger members 57 and the main body of the bracket 51.

The top portion of the bracket member 51 is integrally formed with a ring element 59 which is in axial alignment with the insulating bushing 58, as is clearly shown in Figure 9. The flexible contact arm 52 thus passes through the ring element 59 but normally does not contact same. However, when the upper portion of the flexible arm 52 is engaged by the signal arm 44, the flexible arm 52 is deflected in the manner illustrated in Figure 14 so that it engages the grounding ring 59.

Mounted on the flexible arm 52 above the grounding ring 59 is a terminal collar 70 which is connected by a flexible wire 71 to one terminal of the signal lamp 15. The remaining terminal of the signal lamp is connected by a wire 72 to the ungrounded terminal of the vehicle battery 73. Therefore, when the flexible arm 52 engages the grounding ring 59, the lamp 15 becomes energized by a circuit comprising the ungrounded battery wire 72, the filament of the lamp, the wire 71, the flexible arm 52, the grounding ring 59 and the battery 73, which has one grounded terminal.

As shown in Figure 1, the signalling arm 44 is of sufficient length to engage the free end portion of the flexible arm 52 as the wheel 16 rotates, the arm 44 extending substantially perpendicular to the wheel when the tire pressure drops below a normal safe value, as above explained. Therefore, under these conditions, the arm 44 engages the flexible contact element 52 each time the wheel rotates, thus intermittently connecting arm 52 to the grounding ring 59, whereby the lamp 15 is similarly intermittently energized. This provides a positive warning to the vehicle operator that the tire associated with the blinking lamp is below a safe pressure.

The ball detent 39 cooperates with the retaining groove 38 in the plunger member 31 to prevent premature release of the plunger member and to maintain the plunger member 31 in its non-signalling position until the tire pressure has definitely dropped below a safe value. Thus, false signals are avoided.

After the tire has been restored to its normal pressure, the plunger member is returned to the position thereof illustrated in Figure 2, wherein the ball detent 39 yieldably engages in the groove 38 and wherein the signalling arm 44 is maintained in its normal position, substantially parallel to the plane of the wheel 16.

While a specific embodiment of an improved electrical tire pressure signal system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an electrical tire pressure signal system, a vehicle having a wheel provided with a pneumatic tire, a flexible sack member mounted on the wheel and extending into the tire, whereby said sack member is exposed to the pressure in the tire, a sleeve member mounted on the wheel and extending into said sack member, a plunger member slidably and rotatably mounted in said sleeve member and having a first portion disposed in said sack member, spring means urging said portion inwardly relative to the tire against the pressure in the tire, said plunger member having a second portion extending outwardly relative to the tire, cooperating cam means on the sleeve member and said second portion acting to rotate the plunger member responsive to inward movement thereof relative to the tire, an arm on said second portion, and a contact element on said vehicle intermittently engageable by said arm as the wheel rotates when said plunger member has been moved inwardly relative to the tire responsive to a predetermined reduction in pressure in the tire.

2. In an electrical tire pressure signal system, a vehicle having a wheel provided with a pneumatic tire, a flexible sack member mounted on the wheel and extending into the tire, whereby said sack member is exposed to the pressure in the tire, a sleeve member mounted on the wheel and extending into said sack member, a plunger member slidably and rotatably mounted in said sleeve member and having a first portion disposed in said sack member, spring means urging said first portion inwardly relative to the tire against the pressure in the tire, said plunger member having a second portion extending outwardly relative to the tire through said sleeve member, said sleeve member being formed with an inclined cam slot, a pin element on said plunger member engaged in said slot and cooperating therewith to rotate the plunger member responsive to inward movement thereof relative to the tire, an arm on said second portion, and a contact element on said vehicle intermittently engageable by said arm as the wheel rotates when said plunger member has been moved inwardly responsive to a predetermined reduction in pressure in the tire.

3. In an electrical tire pressure signal system, a vehicle having a wheel provided with a pneumatic tire, a flexible sack member mounted on the wheel and extending into the tire, whereby said sack member is exposed to the pressure in the tire, a sleeve member mounted on the wheel and extending into said sack member, a plunger member slidably and rotatably mounted in said sleeve member and having a first portion disposed in said sack member, spring means urging said portion inwardly relative to the tire against the pressure in the tire, said plunger member having a second portion extending outwardly through said sleeve member, said sleeve member being formed with an inclined cam slot, a pin element on said plunger member engaged in said slot and cooperating therewith to rotate the plunger member responsive to inward movement thereof relative to the tire, an arm on said second portion, a contact element on said vehicle intermittently engageable by said arm as the wheel rotates when said plunger member has been moved inwardly responsive to a predetermined reduction in pressure in the tire, and yieldable detent means in the sleeve member engaging said plunger member and preventing inward movement thereof relative to the tire until said predetermined reduction of pressure therein occurs.

4. In an electrical tire pressure signal system, a vehicle having a wheel provided with a pneumatic tire, a flexible sack member mounted on the wheel and extending into the tire, whereby said sack member is exposed to the pressure in the tire, a sleeve member mounted on the wheel and extending into said sack member, a plunger member slidably and rotatably mounted in said sleeve member and having a first portion disposed in said sack member, spring means urging said first portion inwardly relative to the tire, against the pressure in the tire, said plunger member having a second portion extending outwardly through said sleeve member, said sleeve member being formed with an inclined cam slot, a pin element on said plunger member engaged in said slot and cooperating therewith to rotate the plunger member responsive to inward movement thereof relative to the tire, an arm on said second portion, a flexible elongated contact member secured on said vehicle and having a free end portion intermittently engageable by said arm as the wheel rotates when said plunger member has been moved inwardly responsive to a predetermined reduction in pressure in the tire, said plunger member being formed with an annular peripheral recess, and a spring biased ball detent element mounted in said sleeve member and yieldably engaged in said recess, preventing inward movement of the plunger member relative to said tire until said predetermined reduction in pressure occurs.

References Cited in the file of this patent

UNITED STATES PATENTS

| | | |
|---|---|---|
| Re. 20,351 | Rodney | May 4, 1937 |
| 2,043,277 | Woodberry | June 9, 1936 |
| 2,205,168 | Guthrie | June 18, 1940 |